April 13, 1965 C. SIER 3,177,700
METHOD AND APPARATUS FOR MEASURING THE GAS CONTENT OF MATERIALS
Filed July 18, 1961
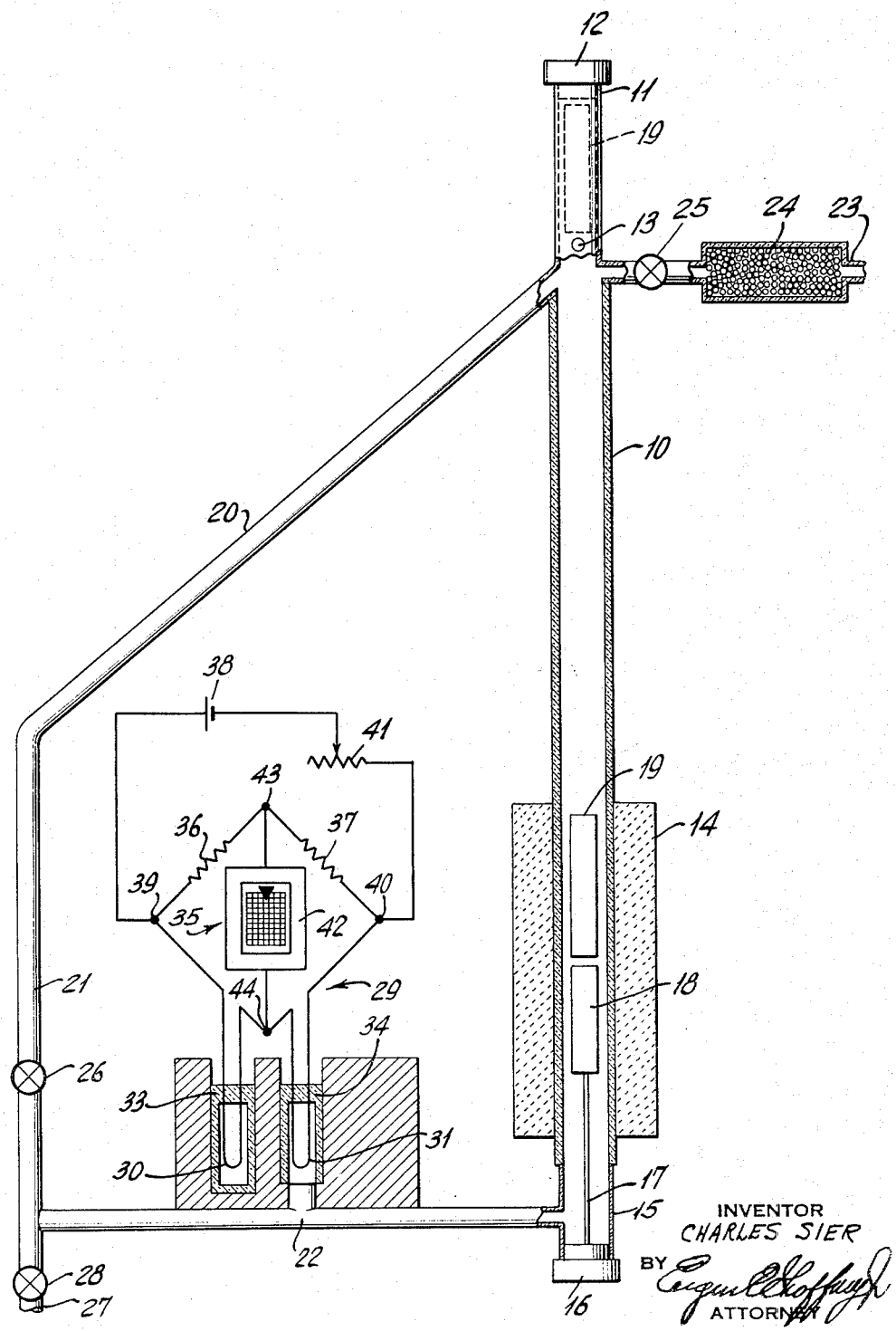
INVENTOR
CHARLES SIER

United States Patent Office 3,177,700
Patented Apr. 13, 1965

3,177,700
METHOD AND APPARATUS FOR MEASURING THE GAS CONTENT OF MATERIALS
Charles Sier, Cambridge, England, assignor to Cambridge Instrument Company, Inc., New York, N.Y., a corporation of New York
Filed July 18, 1961, Ser. No. 124,918
3 Claims. (Cl. 73—19)

This invention relates to the measurement of gas content of materials and more specifically to an improved apparatus for detecting and measuring gas liberated from materials when heated.

The determination of gas content of materials, and particularly metals, has been effected in the past by the utilization of processes involving heating of a metal sample in a vacuum to determine the volume or pressure of the gas evolved or by the use of complicated and time consuming processes. Furthermore, these prior processes required considerable skill, with the result that the cost was relatively high and the accuracy of the results were clearly dependent upon the ability of the operator making the tests.

This invention overcomes the difficulties heretofore encountered in the measurement of the gaseous content of materials and particularly metals and provides a novel and improved apparatus for measuring gaseous content of materials that is characterized by its accuracy, dependability and ease of operation.

Another object of the invention resides in the provision of novel and improved apparatus for measuring both the gas content and rate of evolution of the gas from a material specimen.

The above and other objects of the invention will become more apparent from the following description and accompanying drawing which forms part of this application.

It has been found that the gaseous content of materials, and particularly the hydrogen content of metals can be measured by heating a metal sample in a closed chamber containing a predetermined quantity of inert gas. The mixture of the inert gas and the hydrogen is then circulated and the quantity of the liberated gas mixed with the inert gas is measured by a katharometer. In the case of hydrogen as the liberated gas, and either argon or nitrogen as the inert gas, the hydrogen will cause conduction of heat from the katharometer element exposed to the gas mixture more rapidly than will the inert gas. This accelerated cooling of the katharometer element when hydrogen is presented, is a direct measure of the hydrogen which was liberated from the metal sample. Similarly, gases other than hydrogen can be measured if their heat conduction rates differ from the heat conduction rate of the inert gas used in the system. By reason of the use of the closed system having a predetermined quantity of inert gas, when fed at a preselected pressure, and by controlling the temperature of the sample under test, an accurate measure of the gaseous content of the sample can be made.

It is evident from the foregoing, and it will become even more evident from the following description of the apparatus that the accuracy of measurements obtained will not be a function of the skill of the operator and further, that the measurements may be made quickly, easily and at a relatively low cost.

Referring now to the figure, the apparatus includes a closed gas system comprising a vertically disposed tube 10 preferably of silica or other material having a relatively low temperature coefficient and capable of withstanding high temperatures of at least 800 to 1000 degrees C. The upper end 11 of the tube 10 is closed by a cap 12. A pin 13 extends through the wall of the tube 10 and is slidably sealed in the tube wall so that it can be reciprocated at will. While the tube 10 may have any desired diameter, it has been found that a silica tube wtih a bore of approximately 8 millimeters has proved to be most satisfactory. The tube 10 is surrounded by an electrically heated furnace 14 of any desired type capable of heating the material under test to the desired temperature. In the determination of hydrogen in steel the furnace should have sufficient capacity to raise the temperature of the tube 10 and metal sample contained therein to a temperature of approximately 700 degrees.

The bottom end 15 of the tube 10 is closed by a suitable plug 16 having a pedestal in the form of a stiff wire 17 extending upwardly therefrom and carrying a cylindrical element 18 forming a support for a specimen 19 to be tested. Since the support 18 and the wire 17 are subjected to heat of the furnace, it is important that they be formed of materials which can withstand the normal temperatures involved in carrying out the process.

A closed loop for the circulation of gas is formed by a series of connected tubes 20, 21 and 22 which communicate with upper and lower openings in the tube 10. More specifically, the upper end of the tube 20 is connected with the tube 10 at a point just below the pin 13. The lower end of the tube 20 joins the tube 21 and the lower end of the tube 21 is coupled with tube 22, the latter communicating with the tube 10 at a point below the oven 14. An inert gas such as argon or nitrogen is fed to the tube 23 and through a drying chamber 24 and control valve 25 at a point above the furnace 14. The tube 21 includes a shutoff valve 26 and an outlet 27 is provided at the junction of tubes 21 and 22 controlled by a valve 28.

A katharometer generally denoted by the numeral 29 includes a pair of sensitive elements 30 and 31. These elements are housed in a block 32 to stabilize the ambient temperature about both elements. The element 30 is enclosed in a housing 33 of glass or other suitable material and the element 31 is in a similar housing 34 except that the housing 34 opens into the tube 22 to permit the entry of gas into the housing 34 and about the element 31 by diffusion. The elements 30 and 31 form legs of a Wheatstone bridge 35 having resistors 36 and 37 forming the remaining two legs. A battery 38 or other suitable source of voltage supply is fed to the junctions 39 and 40 of the bridge through a current regulating resistance 41. A suitable recorder 42 which may contain amplifying apparatus and indicating means is connected between the junctions 43 and 44 of the bridge. Since the Wheatstone bridges and associated recording devices 42 for either indicating or recording information are well known, it is felt that a further detailed description is unnecessary.

In the operation of this invention, the furnace 14 is heated to approximately 700 degrees C. for tests on steel and other similar metals. The valves 26 and 28 are opened. Then, with the plugs 12 and 16 closing the ends of the tube 10, the inert gas is admitted to the tube 10 by opening a valve 25. This will permit the inert gas to flush out the system and remove air and other foreign gases. When this has been accomplished, the valve 28 is closed, the plug 12 at the top of tube 10 is removed and a sample of metal to be tested is dropped into the top of the tube as indicated in dotted outline and denoted by the numeral 19. The pin 13 will prevent the sample from dropping into the furnace and at the same time air will be prevented from entering the tube 10 because of the excess pressure of the inert gas entering through the tube 23 and exhausting through the upper end 11 of the tube 10. When the sample is in place the plug 12 is replaced to seal the end of the tube 10. The valve 25 is then closed to stop further admission of inert gas and the pin 13 is withdrawn until the sample 19 drops into the furnace 14, as indicated in solid outline and denoted by the numeral 19.

As the sample is heated by the furnace hydrogen will be liberated from the sample and the heated gas will flow upwardly in tube 10, downwardly in tubes 20 and 21 through tube 22 and back into tube 10. This circulation, produced by the heat of the furnace and the cooling of the gases as they pass through the loop, causes a complete intermixture of the liberated hydrogen with the inert gas and this mixture will diffuse into the chamber 34 and about the element 31. Since hydrogen has a greater heat conductivity than that of argon or nitrogen, for instance, the presence of hydrogen will cause more rapid cooling of the element 31 than that which would occur with just the argon or nitrogen. Inasmuch as the elements 30 and 31 will both be heated by reason of the application of a potential from the battery 38 to the bridge junctions 39 and 40, and since the elements 30 and 31 when heated maintain the bridge in an adjusted balance, then, should the element 31 be cooled, the bridge will become unbalanced and an indication will appear on the recorder 42. Thus, the greater the quantity of hydrogen liberated from the sample 19, the greater the cooling effect on the element 31 and the larger the reading on the recorder 42.

When the test has been completed, the plug 16 is removed from the bottom end 15 of the tube 10 and the sample supporting structure 17 and 18 is withdrawn to effect removal of the sample 19. The plug 16 and elements 17 and 18 are then replaced and the apparatus is ready for the next test.

In some instances it is desirable to determine the rate at which a gas such as hydrogen will be liberated from a specimen during the heating process. To perform this test the valves 25, 26 and 28 are opened to flush the system of unwanted gases such as air and the like, as in the case of the test previously described. When this has been accomplished valves 26 and 28 are closed. The plug 12 is then removed and a sample 19 is inserted, whereupon the plug 12 is replaced. The valve 28 is then opened so that inert gas will flow through the valve 25 into the tube 10, then downwardly through the tubes 10 and 22 and exhausted through the outlet 27. The pin 13 is then withdrawn to permit the sample 19 to drop into the furnace 14 and as the sample increases in temperature, the amount of hydrogen liberated from the sample will intermix with and be carried by the inert gas downwardly through tube 10 and outwardly through tube 22. In so doing the gas mixture passes the entrance to the katharometer which will measure the rate at which the hydrogen gas is liberated during the heating process.

While the foregoing description pertained essentially to the measurement of hydrogen in materials such as steel, it is quite evident that other gases contained in steel or other materials may also be measured by the improved apparatus forming the subject matter of this application. If two or more gases are liberated from the material during the test and such gases differ in heat conductivity from the inert gas, the katharometer reading will be affected by both of the liberated gases. With metals, hydrogen is by far the most prominent gas contained therein and the apparatus in accordance with the invention can be considered specific to hydrogen in such cases.

While only one embodiment of the invention has been illustrated and described, it is apparent that alterations, modifications and changes may be made without departing from the true scope and spirit as defined by the appended claims.

What is claimed is:

1. Apparatus for measuring the gas content of materials comprising a double open-ended tube having two upper openings adjoining its upper end and a lower opening adjoining its lower end, removable closures on the ends of said tube, a furnace surrounding a portion of said tube, a valve connected on one side to one of said upper openings for the admission of an inert gas, a tubular member connected at one end to the other of said upper openings and at the other end to said lower opening to form a closed loop, said tubular member including an opening, a valve connected with said opening, a katharometer including a diffusion chamber communicating with said closed loop and indicating means responsive to the gas diffusing into said chamber.

2. Apparatus according to claim 1 wherein said tubular member includes valving means for interrupting gas flow therethrough, the last said valving means being positioned between said opening in the tubular member and its connection to said upper opening, and wherein said diffusion chamber communicates with that portion of said loop defined by said furnace, the lower opening of said tube and the opening in said tubular member.

3. Apparatus according to claim 1 including a drying chamber connected with the first said valve to remove moisture from said inert gas.

References Cited in the file of this patent

UNITED STATES PATENTS

| | | |
|---|---|---|
| 2,387,878 | Brown | Oct. 30, 1945 |
| 2,861,450 | Ransley | Nov. 25, 1958 |

FOREIGN PATENTS

| | | |
|---|---|---|
| 706,535 | Great Britain | Mar. 31, 1954 |